June 17, 1941.　　O. OECKL ET AL　　2,245,806
RIVETING TOOL
Filed June 1, 1938　　4 Sheets-Sheet 2
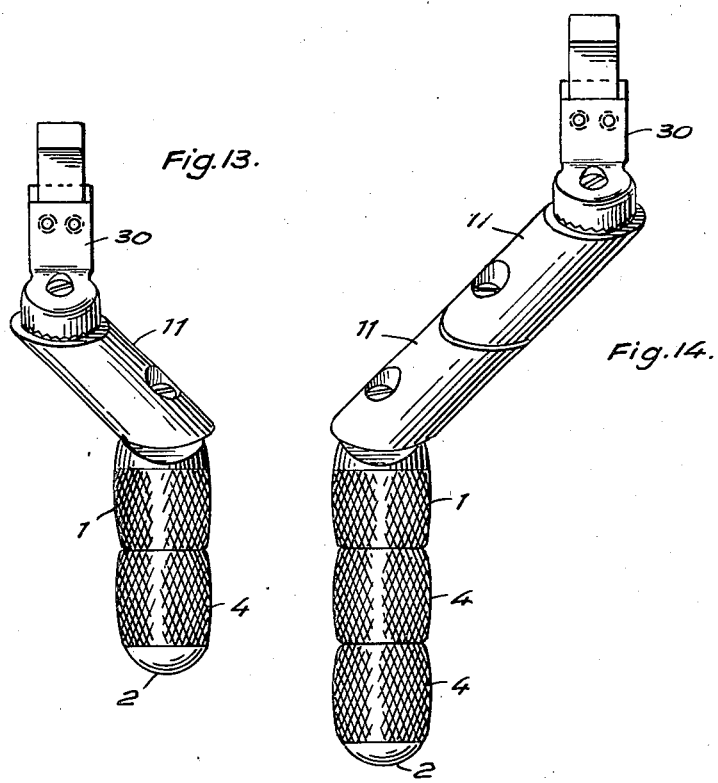
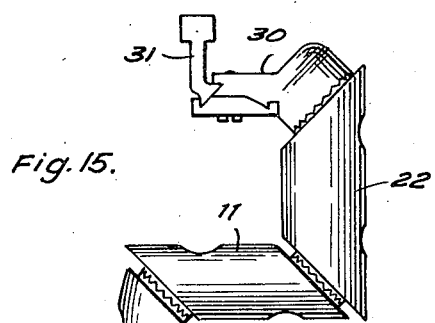
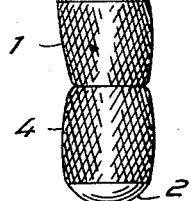
Inventors:
OTTO OECKL
HEINRICH WEATH
by Walter S. Bleistein
ATTORNEY

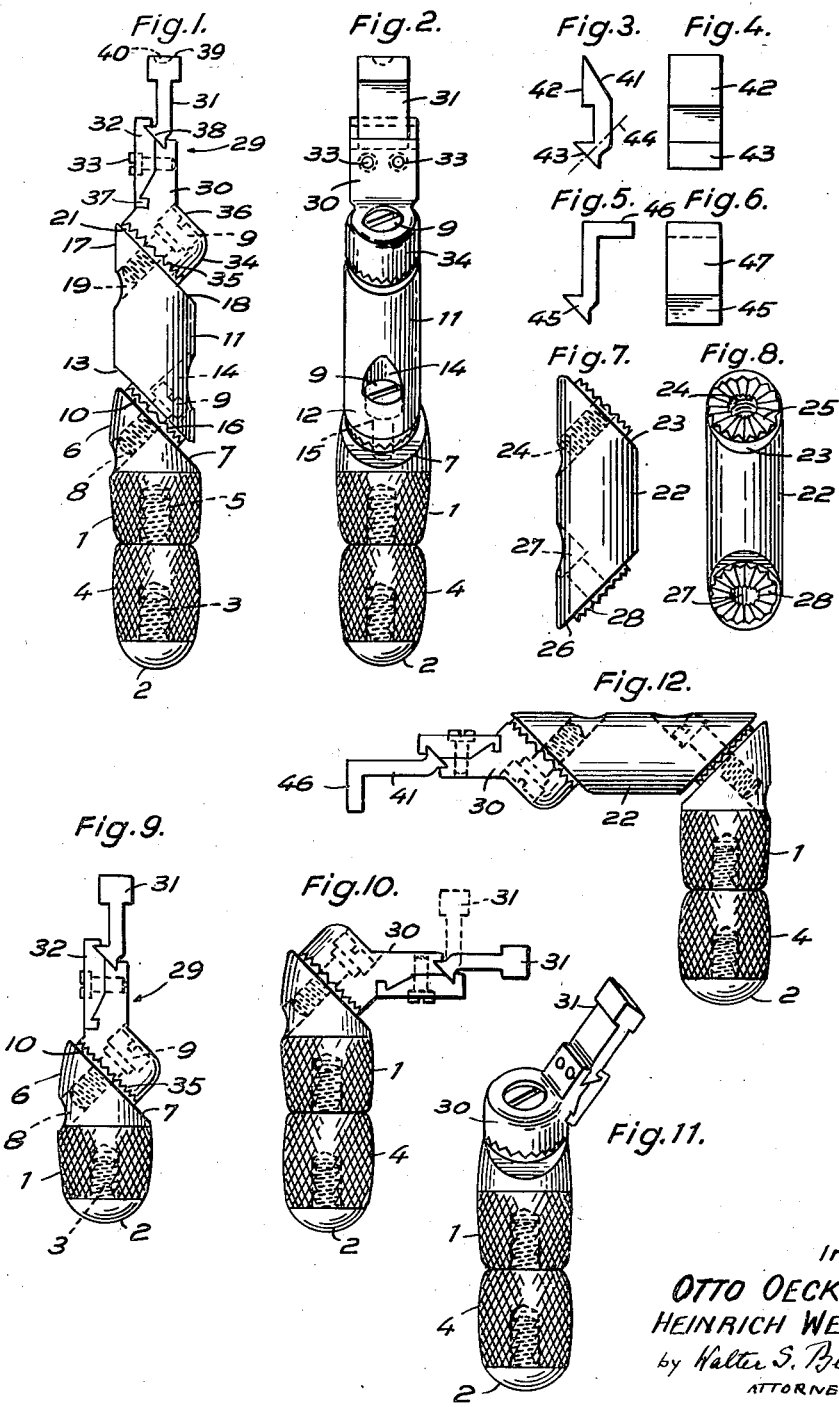

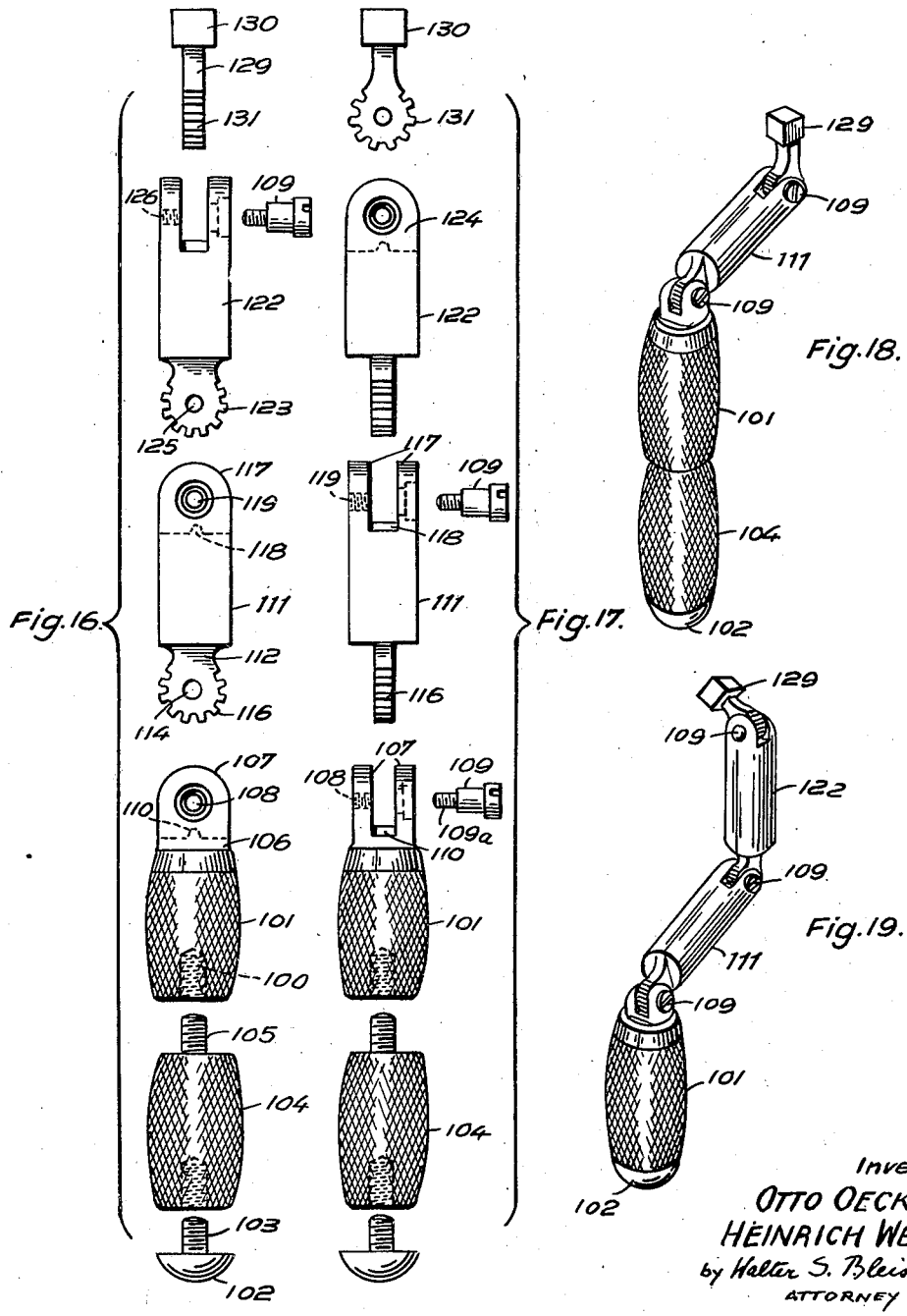

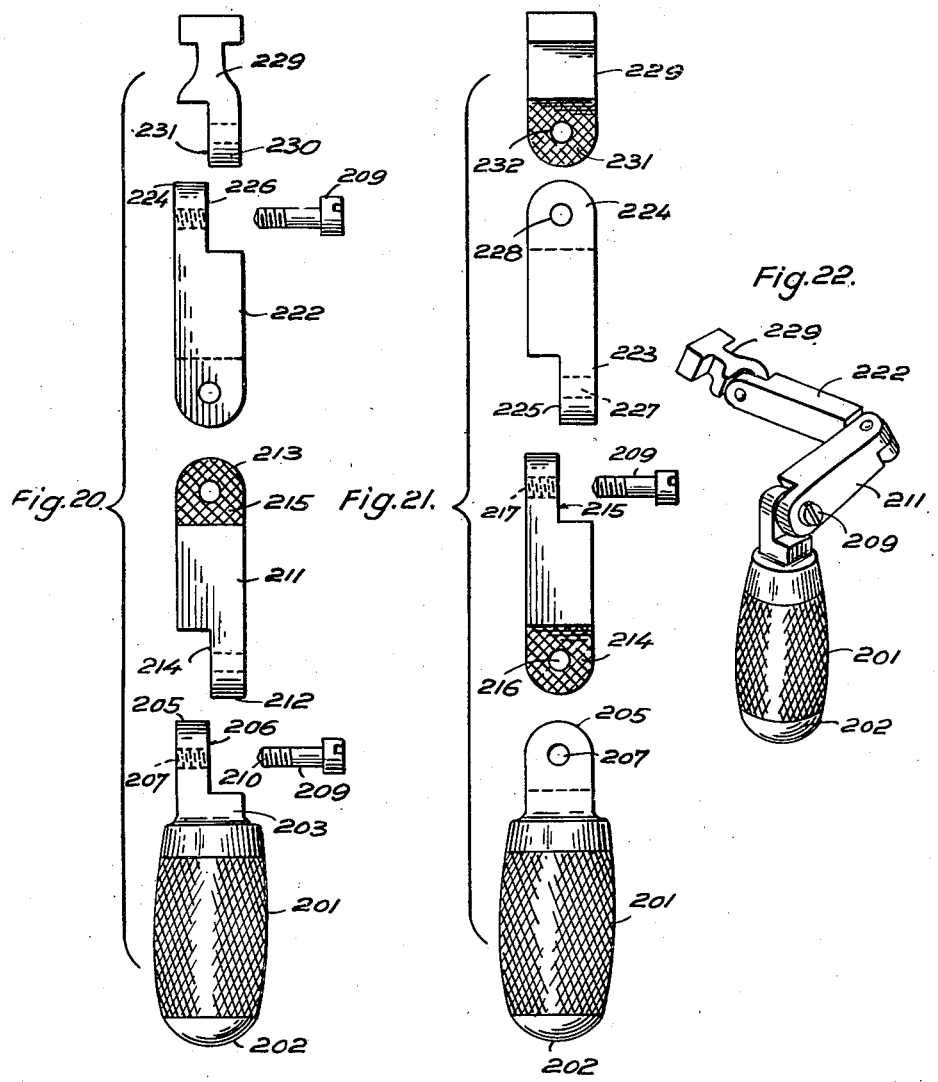

Patented June 17, 1941

2,245,806

UNITED STATES PATENT OFFICE 2,245,806

RIVETING TOOL

Otto Oeckl and Heinrich Werth, Berlin, Germany, assignors to Henschel Flugzeug-Werke A. G., Schonefeld, Kreis Teltow, Germany Application June 1, 1938, Serial No. 211,176
In Germany June 14, 1937

8 Claims. (Cl. 78—46)

The present invention relates to a riveting tool, particularly for the riveting of structures having complex forms where it is difficult to apply the holding-up tool or the setting tool to a rivet to be driven. Examples of such complex structures are the fuselage and the wings of metal airplanes in which obstructions such as ribs, spars, partitions, etc., prohibit the application of a straight-lined instrument. In fact, hitherto, a great number and variety of tools differing from each other in shape and size were frequently required to complete the riveting of one job. In consequence thereof, a large store of differently shaped riveting tools had to be maintained at a considerable expenditure in storage space and money, and much time was spent to select from such store a suitable tool in each instance.

The present invention aims to provide a tool which avoids such drawbacks, and which is useful for accomplishing the work for which hitherto a great number and variety of individual tools were needed.

The invention mainly consists of a riveting tool in which the distance of the tip surface from the handle may be varied in the longitudinal direction of the handle as well as perpendicularly thereto, and in which also the angle included by a tip portion and the handle may be altered.

The invention further consists of a combination riveting tool composed of several parts preferably having different lengths which parts may be connected selectively and at a desired angle with respect to each other.

The invention also consists of a tool of the mentioned type in which the various parts have fitting end surfaces aslant with respect to their respective axes or longitudinal directions in order to offer the means for an easy and quick adjustment of the parts to different angular positions relatively to each other.

The invention also consists in a novel construction of a set of tools having interchangeable parts.

Further objects and details of the present invention are apparent from the description hereinafter and from the accompanying drawings showing several embodiments thereof by way of example.

In the drawings,

Fig. 1 is a side view of an embodiment of the invention,

Fig. 2 is a front view thereof,

Figs. 3 to 6 are side and front elevations respectively of two differently formed tips of the tool, Figs. 7 and 8 are side and front elevations respectively of a modified form of an intermediate member, Figs. 9 to 11 show parts of the embodiment of Fig. 1 in various combinations and relative positions, Fig. 12 shows a tool composed of parts of that of Fig. 1 and of the intermediate member illustrated in Fig. 7, Figs. 13 to 15 show various combinations of parts illustrated in the preceding figures, Figs. 16 and 17 are side and front elevations respectively of the individual parts of another embodiment, Figs. 18 and 19 illustrate two different combinations of parts of Fig. 17, and Figs. 20 and 21 are side and front elevations respectively of the disassembled parts of another embodiment, which in Fig. 22 is illustrated in the assembled state.

In the embodiment illustrated in Figs. 1 to 15, the tool comprises a handle of a suitable design. Preferably, the handle is composed of a main part 1 and an end part 2 which may have a rounded surface as shown in order to fit well into the operator's hand when the tool is used as a holding-up tool. If the tool is used as a riveting set, the easily replaceable part 2 will protect the main part 1 against injuries by the hammer. In order to connect the parts to each other, part 1 may have a threaded bore and part 2 a threaded shank or pin 3 adapted to be screwed into the said bore as clearly shown in Fig. 9.

In riveting, the holding-up tool should have a weight corresponding to the material and size of the rivet to be driven. In view of this fact, means are provided to increase the weight of the tool as may be desired. For this purpose, one or more weighting pieces 4 may be secured to parts of the tool. In the preferred form, such weighting pieces are shaped so as to constitute a continuation of the handle part 1. Each piece 4 has a threaded pin 5 and threaded bore similar to that of part 1. In consequence thereof, a weighting piece 4 may be inserted between parts 1 and 2 and secured together with them as shown in Fig. 1. If a plurality of weighting pieces are used, they may be connected in a similar manner as indicated in Fig. 14. The various weighting pieces may be of different size and weight, and may be provided in sets so that the user may select the combination most suitable for the individual job.

The upper end 6 of the handle is so shaped as to form a portion of a joint or articulation for the adjustment of a connected member as to its angular position relatively to the handle. Various designs are suitable for this purpose. In the embodiment of Figs. 1 to 12, handle end 6 has a substantially plane surface 7 inclined with respect to the axis or longitudinal direction of the handle 1. A bore 8, preferably threaded, is provided in the handle end 6 approximately in the center of and perpendicular to surface 7. Bore 8 serves to receive a pivot pin 9 defining the axis of the joint. For a purpose to be explained hereinafter, surface 7 is provided also with a rosette 10 of radial teeth or serrations.

The tool further comprises an intermediate member 11. One end 12 of member 11 is so shaped as to form a counter-piece to the joint portion formed by the end 6 of handle 1. For this purpose, the end portion 12 of member 11 has a surface 13 inclined with respect to the axis or longitudinal direction of member 11, and a bore 14, preferably reduced, at 15, approximately in the center of surface 13 and perpendicular thereto. Surface 13 is provided with a rosette 16 of serrations or teeth adapted to mesh with those of rosette 10. Now it is apparent that member 11 may be turned about a pin 9 inserted into the bores 8 and 14 when said pin 9 allows sufficient clearance between surfaces 7 and 13 so that the serrations of rosettes 10 and 16 do not catch. Owing to the fact that the axis of pin 9 is inclined with respect to the axes of handle member 1 and intermediate member 11, said members may be set relatively to each other so as to include a selected angle.

Various means may be provided to lock the members relatively to each other in a selected position. In the embodiment of Figs. 1 to 15, such means consist of the above mentioned rosettes 10 and 16. In order to effect interlocking of said rosettes, means are provided to press the corresponding parts together. For this purpose, pin 9 may have a threaded portion for engagement with the threads of bore 8, and a head for engagement with the threaded bore 8. When the members are in adjusted relative position screwing down of pin 9 forces the serrations of the rosettes into mesh and prevents an alteration of the angle included by members 1 and 11. Loosening of pin 9 permits readjustment of the members, and by removing pin 9, members 1 and 11 may be detached from each other.

As to the inclination of the surfaces 7 and 13 with respect to the axes of the handle 1 and the intermediate member 11 respectively, I prefer to employ an angle of 45°. If this is done, the teeth of the rosettes are not subjected to a shearing stress when the member 11 is set with respect to handle 1 at an angle of 90°, i. e. the angle most frequently used.

The upper end 17 of the intermediate member 11 is shaped in the same manner as the end 6 of the handle member 1, that is to say, end 17 comprises a slanting surface 18, a threaded bore 19 for a pin 9 of the same character as the pin mentioned in connection with the handle member 1, and a serrated rosette 21 on surface 18. A plurality of intermediate members 11 may be present, as for instance shown in Fig. 14. They may differ in length and other proportions. However, it is imperative in the present invention, that each intermediate member should have one of its ends shaped to fit the end 6 of handle 1, and its other end like said handle end. It will be noted that the surfaces 13 and 18 of intermediate member 11 are parallel with each other while the modified intermediate member 22 illustrated in Figs. 7 and 8 has one surface 23 with bore 24 and serrated rosette 25 exactly like the corresponding elements 18, 19 and 21 of member 11, the opposite end surface 26, however, being at an angle, in fact at a right angle to surface 23. The angle included by surfaces 23 and 26 may be suitably chosen. I prefer an angle of 90° for the same reason as explained with respect to the angle of 45° included by surface 7 and the longitudinal direction of the handle 1. The end of member 22 having the surface 26 is provided with a bore 27 and a serrated rosette 28, the same as end 12 is provided with bore 14 and serrated rosette 16.

The tool according to the present invention furthermore comprises a tip member 29 of suitable design so as to be connected selectively either with handle 1 or, as shown in Figs. 1 and 2, with one of said intermediate members, for instance member 11. In the embodiment of Figs. 1 to 15 the tip member comprises several parts, namely a tip holder 30, a tip proper 31, a tip-securing member 32 and means for fixing member 32 to the tip holder 30, such means being indicated by screws 33. The lower end 34 is designed similar to the end 12 of intermediate member 11, that is to say, it is made to be fitted selectively either to one of the intermediate members or to the handle 1. For this purpose it is provided with a serrated rosette 35 on its lower face slanting with respect to the longitudinal direction of the tip holder, and with a bore 36 through the center of and perpendicular to the serrated face. The upper portion of the holder is provided with a recess so formed as to receive a projecting ledge 37 of the tip-securing member 32. The top ends of the latter and of the holder are also recessed so as to securely clamp the tip 31 therebetween, when member 32 is fastened to holder 30 by means of screws 33.

In the embodiment of Figs. 1 to 15, the tip has a dove-tail foot 38 fitting with its edges into the holder 30 and the securing member 32 respectively. The working face 39 of the tip may be shaped in a manner suitable for the job to be accomplished with the tool. It may for instance be plane or cupped as indicated at 40.

In order to make the tool useful for a great variety of jobs, a plurality of tips may be provided which may be selectively secured to the tip holder 30. Two examples of such tips are illustrated in Figs. 3 to 6. These tips have a foot form like that of tip 31 for which they may be exchanged in the holder. The tip of Figs. 3 and 4 is wedge-shaped with its surfaces 41 and 42 either one of which may be used in riveting. The dove-tailed foot 43 is symmetrically shaped with respect to a plane indicated by the dash and dot line 44. Said plane is set at an angle to the working surfaces. Owing to this design, the tip may be secured to the holder 30 in two different ways whereby each working surface may have either of two different positions relative to the longitudinal direction of the holder 30. This is clearly apparent from the illustration of the tip 31 in Fig. 10 where the working surface 39 in the position of the tip shown in solid lines is perpendicular to the longitudinal direction of holder 30, and where it is parallel thereto, in the position of the tip indicated in dash lines. In a similar manner, the tip illustrated in Figs. 5 and 6 is provided with a dove-tailed foot 45 and with a working surface 46 arranged at right angles to the middle portion 47. Hence, tip 31 and the tips of Figs. 3 to 6 constitute a set of differently shaped parts which may be selectively used in the tool according to the invention.

It will be noted that in the new tool the upper end of the handle and one end of each of the intermediate members are shaped alike so that each will form one member of a joint or articulation, and also that the lower end of the tip member and the other ends of the intermediate members are shaped alike so that each will form a counter-piece to said members of a joint or articulation. In consequence thereof, the tool may be adjusted in a great variety of combinations, some of which are shown in Figs. 1 and 9 to 15 by way of example. In Fig. 1, the tool is straight lined that is to say, handle 1 with weighting piece 4, intermediate member 11, and tip member 29 are in an aligned position. The interlocked rosettes 10, 16 and 21, 35 prevent an undesired change of the relative positions of the parts.

In the combination of Fig. 9 the weighting piece 4 and the intermediate piece 11 are removed, and the handle 1 is directly jointed to the tip member 29. This is the combination in which the tool offers the smallest size and least weight. In Fig. 10 a weighting piece 4 is added to the parts of Fig. 9, and the tip holder 30 is turned with respect to the handle so as to include with the latter an angle of 90°. This is accomplished by first loosening pin 9 in Fig. 9 until serrated rosette 35 is clear of serrated rosette 10, then turning holder 30 into its desired position, and finally tightening pin 9 in order to hold the rosettes in interlocked relation. As stated above tip 31 is shown in two different positions with respect to holder 30. In Fig. 11, the same parts are present as in Fig. 10. However, holder 30 is turned from its original position a smaller angle than in Fig. 10. In consequence thereof, tip 31 is aslant with respect to the longitudinal direction of the handle 1.

The combination of Fig. 12 comprises the same parts as Fig. 10 except tip 31 for which the tip of Fig. 5 has been substituted. In addition thereto, an intermediate member 22 is inserted between handle 1 and tip holder 30. In the illustrated combination, the tip projects perpendicularly from the handle, with a working surface 46 parallel to the same.

Three other combinations and relative positions of the parts are shown in Figs. 13 to 15. In view of the foregoing description, they do not require additional explanation as to their specific merits and compositions.

A tool according to my invention may be made in various forms. Two additional examples are illustrated in Figs. 16 to 19 and 20 to 21 respectively. Figs. 16 and 17 show the parts of the first one of said additional forms, detached from each other. Similar to the handle of Fig. 1, the handle member 101 is provided with a threaded bore 100 into which either the shank or pin 103 of an end piece 102, or the shank or pin 105 of a weighting member 104 may be screwed. The upper end 106 of handle member 101 is fork-shaped with the prongs 107 extending in continuation of the longitudinal direction of the handle. The prongs have a bore 108 to receive a pivot pin 109, which may be held in position by any suitable means for instance by screw threads 109a on said pin and corresponding threads in said bore 108. A tooth or dog 110 is provided on the bottom of the fork-shaped portion of the handle member 1. The intermediate member 111 shown above the handle member 1 is provided, at its lower end, with a tongue-like continuation 112 which fits between the prongs 107, and has a toothed rim 116 and a center bore 114. When member 111 is inserted in the fork-shaped portion of the handle so that the bores 108 and 114 are in registry, tooth 110 will engage a recess between two adjacent teeth of rim 116. Consequently, member 111 can be selectively adjusted relative to handle member 101 in as many different angular positions as there are recesses between each two teeth of the rim 116. When the position of the member 111 is properly adjusted, it may be secured by pin 9 inserted into the bores 108 and 114, and screwed into the threads therein. The upper end of the intermediate member is shaped in the same manner as the end 106 of the handle member, that is to say, it is fork-shaped with the prongs 117, a tooth 118, on the bottom between the prongs, and a bore 119 in the prongs for the reception of a pin 109. It will be noted that the bores 114 and 119 of the intermediate member 111 are parallel with each other. In consequence thereof, members jointed to both ends respectively of the intermediate member will be adjustable in one plane. In many instances, however, it is desirable to have the possibility of adjustment in another plane also. For this purpose, another type of intermediate members may be provided, such as member 122. Said member 122 has end portions 123 and 124 similar to those of intermediate member 111 with this difference, however, that the surfaces of the tongue 123 are at right angles to the surfaces of the prongs 124. In consequence thereof, a member jointed to the upper end of member 122 will be adjustable in a plane including right angles with the plane in which a member jointed to the lower end of member 122 is adjustable. The tip member 129 of the embodiment shown in Figs. 16 to 19 is made of one piece in contra-distinction to the tip member 29 of Fig. 1 which is composed of several parts. The tip member 129 comprises the tip portion 130 adapted to engage the rivet to be driven, and a tongue portion 131 exactly shaped like the tongues 112 and 123 of the intermediate members 111 and 122 respectively.

Fig. 18 shows by way of example a combination of the tool parts with one weighting member and one intermediate member in addition to the handle and the tip member. In Fig. 19 an intermediate member 122 is added and the weighting member removed. A tool set may be assorted in a similar manner as stated with respect to the first embodiment.

In order to have the same variety of working faces available as in the embodiment of Figs. 1 to 15, several tip members 129 having differently shaped tip portions may be provided to constitute a complete set of tools as described hereinbefore.

It will be noted that the toothed rosettes, e. g. rosettes 10, of the tool according to Figs. 1 to 15, and the toothed rims, e. g. rim 116 of the tool according to Figs. 16 to 18 allow an adjustment of the respective members only in a number of certain positions defined by the pitch and arrangement of the teeth. In other words, the steps of adjustment are rather wide. Although in general, this is fully sufficient to make the tool applicable wherever the particular job may require it, there may be cases in which a finer adjustment may be desirable. Such finer adjustment may be had with the tool illustrated in Figs. 20 to 22. The tool, essentially comprising parts similar to those shown in Figs. 16 to 19, has joints or articulations formed in a slightly different manner.

Handle 201 is provided with an end piece 202, and weighting members of the type illustrated in the preceding figures may be inserted between the two parts. The upper end 203 of the handle is recessed at 204 so as to form an ear 205 one surface 206 of which lies in a longitudinal center plane of the handle. Similarly, the ends of an intermediate member 211 form ears 212 and 213, having inner surfaces 214 and 215 respectively in longitudinal center planes of said member. In a like manner, the intermediate member 222 and the tip member 229 have ears 223, 224, and 230 with inner surfaces 225, 226 and 231 respectively. The ears are bored at 207, 216, 217, 227, 228, and 232 and the bores 207, 217 and 228 are threaded, to receive the pivot pins 209 each having a threaded portion 210. The inner surfaces 206, 214, 215, 225, 226 and 231 are roughened so as to offer high frictional resistance against relative movement of each two of said surfaces when pressed firmly into engagement. From the foregoing it will be apparent that relative adjustment of two members jointed together, as for instance handle 201 and intermediate member 211 in Fig. 22, may be obtained by first slightly loosening pivot pin 209, then turning members 201 and 211 relatively to each other until they are in the desired position, and finally screwing pin 209 down to press the roughened surfaces of ears 205 and 212 tightly together, thus creating a high frictional resistance against undesired alteration of the adjusted position. An adjustment and relative locking can be had in any desired position because there are no teeth present to restrict the variability of adjustment according to their pitch. It will be observed that the ears of the intermediate members 211 and 222 are so arranged that the plane of articulation of both these members is perpendicular to the plane of articulation of member 211 and handle 201.

The device according to my invention offers this advantage that the same tool may be used for practically all riveting jobs which may occur. The adjustability of the relative angular positions of the parts of the tool makes it possible to reach the rivet to be driven even in very complex structures such as a hollow body in which ribs, projections, partitions and the like form obstructions to the application of conventional tools. With particular advantage my tool is provided as a set comprising only one handle, a few weighting members, intermediate members, pivot pins and tip members, preferably of different sizes. A single set of such kind is capable of doing the job, as for instance in the construction of certain metal airplanes, for which hitherto as many as several hundred of differently shaped tools were indispensable. The necessary combinations and adjustments of the individual parts can be easily effected, and frequently even in a much shorter time than required for selecting a suitable tool for a particular job out of a great number of tools of conventional type.

It will be noted that the axes of the bores 8, 14, 19 and 24 in Figs. 1 to 15, and therefore the axes of the pivot pins or screws 9 located in said bores, are oblique relatively to the longitudinal axes of the members provided with such bores. This enables us to bring the parts into a great variety of different positions, and even, in cases where at least three members arranged in tandem fashion are connected by such joints, to adjust the members to positions in which the longitudinal axis of one of them will not be in the same plane as the longitudinal axes of two other members, but will intersect such plane. Similarly, in the constructions illustrated by Figs. 16 to 19, and 20 to 22 respectively, the longitudinal axis of one member (for instance the tip member 129 in Figs. 16 to 19, or that of the tip member 229 in Figs. 20 to 22) can be brought to a position in which it will intersect the plane containing the longitudinal axes of two other members when the latter are out of axial alignment, for instance the members 122 and 111 (as well as the member 101) in Fig. 19, or the members 211, 201 in Fig. 22. This is possible owing to the fact that the axis of the pivot joint at one end of the member 122 in Figs. 16, 17 and 19 and of the member 222 in Figs. 20, 21, and 22 is in skew relation to the axis of the pivot joint at the other ends of said members. Specifically these two skew pivot axes are shown as perpendicular to the longitudinal axes of the members 122 and 222 respectively.

While I have described certain embodiments of my invention, various changes therein, and in the shape and arrangement of parts may be made in practice without departing from the spirit of my invention or the scope of the appended claims.

I claim:

1. An implement of the character described, comprising at least three members arranged in tandem fashion and pivotally connected with one another at their adjacent ends so as to be adjustable in angular relation to each other, the adjacent ends of said members embodying means to prevent them from undesired angular movement, and means for locking said members at their pivotal connections in an adjusted position, a first one of said members being an end member forming a handle, a second one of said members being an end member forming a tip member or tool-carrying member, and the pivot axis the one end of a third one of said members being in transverse relations to the pivot axis at the other end of such member.

2. An implement of the character described, comprising at least three members arranged in tandem fashion and pivotally connected with one another at their adjacent ends and means for locking said members at their pivotal connections, one of said members being an end member, forming a handle, and another of said members being an end member forming a tip member or tool-carrying member, the pivot axis at one end of one of said members being in skew relation to the pivot axis at the other end of such member.

3. An implement of the character described, comprising at least three members arranged in tandem fashion and pivotally connected with one another at their adjacent ends and means for locking said members at their pivotal connections, one of said members being an end member forming a handle, and another of said members being an end member forming a tip member or tool-carrying member, the pivot axis at one end of one of said members being in skew relation to the pivot axis at the other end of such member, and each of said two skew pivot axes being perpendicular to the longitudinal axis of said member.

4. An implement of the character described, comprising a plurality of members arranged in tandem fashion and pivotally connected with one another at their adjacent ends and means for locking said members at their pivotal connections the axis of the least one of such pivotal connections being oblique relatively to the longitudinal axes of the two members linked by said pivotal connection.

5. An implement of the character described, comprising at least three members arranged in tandem fashion and pivotally connected with one another at their adjacent ends and means for locking said members at their pivotal connections, one of said members being an end member forming a handle, and another of said members being an end member forming a tip member or tool-carrying member, the axis of the pivotal connection between the tip member and the adjoining member being oblique relatively to the longitudinal axes of the tip member and of said adjoining member, and the axis of the pivotal connection between the handle member and the member adjoining such handle member being oblique relatively to the longitudinal axes of the handle member and of the last-mentioned adjoining member 6. An implement of the character described, comprising a plurality of members arranged in tandem fashion and pivotally connected with one another at their adjacent ends, and means for locking said members at their pivotal connections the axis of at least one of such pivotal connections forming an angle of 45° with the longitudinal axes of the two members linked by said pivotal connection.

7. An implement of the character described, comprising at least three members arranged in tandem fashion and pivotally connected with one another at their adjacent ends and means for locking said members at their pivotal connections, one of said members being an end member forming a handle, and another of said members being an end member forming a tip member or tool-carrying member, the axis of the pivotal connection between the tip member and the adjoining member forming an angle of 45° with the longitudinal axes of said two members, and the axis of the pivotal connection between the handle member and the member adjoining such handle member forming an angle of 45° with the longitudinal axes of said handle member and of the member adjoining such handle member.

8. An implement of the character described, comprising a plurality of members arranged in tandem fashion and pivotally connected with one another at their adjacent ends, the axis of at least one of the pivotal connections being oblique relatively to the longitudinal axes of the two members linked by said pivotal connection, means for locking said members at their pivotal connections, one of said members being a tip member or tool-carrying member, while another of said members form a handle, and a weighting member similar in shape to said handle member and secured thereto detachably in axial alignment therewith.

OTTO OECKL.
HEINRICH WERTH.